United States Patent
Ramos Cordova et al.

(10) Patent No.: US 11,796,701 B2
(45) Date of Patent: Oct. 24, 2023

(54) SYSTEM, METHOD, AND PROCESSING MODULE FOR DETECTING ONE OR MORE OBJECTS IN THE SEABED

(71) Applicant: Fraunhofer-Gesellschaft zur Foerderung der angewandten Forschung e.V., Munich (DE)

(72) Inventors: Carlos Alejandro Ramos Cordova, Bremen (DE); Benedict Preu, Bremen (DE); Nikolas Stange, Bremen (DE); Volkhard Spiess, Bremen (DE); Stefan Wenau, Bremen (DE); Hanno Keil, Thedinghausen (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 130 days.

(21) Appl. No.: 17/310,356

(22) PCT Filed: Dec. 30, 2019

(86) PCT No.: PCT/EP2019/087154
§ 371 (c)(1),
(2) Date: Jul. 29, 2021

(87) PCT Pub. No.: WO2020/156748
PCT Pub. Date: Aug. 6, 2020

(65) Prior Publication Data
US 2022/0107436 A1 Apr. 7, 2022

(30) Foreign Application Priority Data
Feb. 1, 2019 (DE) .......................... 102019102548.6

(51) Int. Cl.
*G01V 1/38* (2006.01)

(52) U.S. Cl.
CPC .......... *G01V 1/3843* (2013.01); *G01V 1/3808* (2013.01)

(58) Field of Classification Search
CPC .......................... G01V 1/3843; G01V 1/3808
See application file for complete search history.

(56) References Cited

U.S. PATENT DOCUMENTS

| | | | |
|---|---|---|---|
| 5,886,661 A * | 3/1999 | Harrison | H01Q 1/04 342/28 |
| 8,400,872 B2 | 3/2013 | Gulgné et al. | |

(Continued)

FOREIGN PATENT DOCUMENTS

| | | |
|---|---|---|
| CN | 101581785 B | 12/2011 |
| CN | 107817523 A | 3/2018 |

(Continued)

OTHER PUBLICATIONS

Bangs. Nathan L.B. et al.: "The mechanics of intermittent methane venting at South Hydrate Ridge inferred from 3D seismic surveying", Earth and Planetary Science Letters 310, 2011, 105-112.

(Continued)

*Primary Examiner* — Ian J Lobo
(74) *Attorney, Agent, or Firm* — 2SPL Patentanwälte PartG mbB; Yong Beom Hwang

(57) ABSTRACT

Embodiments relate to a system, to methods, and to a processing module for detecting one or more objects in the seabed, wherein the detection of the one or more objects is based on the scattering of the at least one acoustic signal at the one or more objects. The system comprises an attachment structure (10). The attachment structure is intended to mechanically couple a signal source (20) and a plurality of receivers (30) to a vessel or to a propulsion unit. The system comprises the signal source (20) configured to emit at least one acoustic signal towards the seabed. A wavelength of the acoustic signal is adapted to an expected size of the one or (Continued)

more objects. The system comprises the plurality of receivers (30). A distance between adjacent receivers is at most half the wavelength of the acoustic signal. The plurality of receivers is configured to generate a receiver signal based on a scattering of the at least one acoustic signal at the one or more objects. The system comprises a processing module (40) configured to detect the one or more objects based on the receiver signal. The detection of the one or more objects is based on the scattering of the at least one acoustic signal at the one or more objects.

18 Claims, 5 Drawing Sheets

(56) References Cited

U.S. PATENT DOCUMENTS

| | | | |
|---|---|---|---|
| 8,400,874 | B2 | 3/2013 | Gulgné et al. |
| 8,867,307 | B2 | 10/2014 | Gulgné et al. |
| 9,075,154 | B2 | 7/2015 | Gulgné |
| 9,304,224 | B2 | 4/2016 | Gulgné |
| 9,316,755 | B2 | 4/2016 | Gulgné et al. |
| 9,476,997 | B2 | 10/2016 | Pace et al. |
| 9,568,627 | B2 | 2/2017 | Gulgné et al. |
| 2007/0223306 | A1 | 9/2007 | Toennessen |
| 2008/0025146 | A1 | 1/2008 | Welker |
| 2008/0239873 | A1* | 10/2008 | Tsurugaya .......... G01S 7/52004 367/93 |
| 2013/0170317 | A1 | 7/2013 | Stork |
| 2016/0202213 | A1* | 7/2016 | Volker ................. G01N 29/043 73/598 |
| 2016/0252616 | A1 | 9/2016 | Wilby |

FOREIGN PATENT DOCUMENTS

| | | |
|---|---|---|
| EP | 2733508 A1 | 5/2014 |
| WO | 20030104842 A1 | 12/2003 |

OTHER PUBLICATIONS

Belkacem, Afif et al.: "Planar SAS for Sea Bottom and Subbottom Imaging: Concept Validation in Tank", IEEE Journal of Oceanic Engineering vol. 31, No. 3, Jul. 2006, pp. 614-627.
Brissette, M.B., "Mine Detection Using Swath Bathymetric Sonars: Tools and Techniques", Mosaic Hydrographic Services (Canada) Ltd. (2006).
Dinn, Gary: "Field experience with a new sub-bottom investigation tool: Acoustic 3-D imaging of the sub-seabed", 2012 Oceans. Presented at the 2012 Oceans, pp. 1-9.
Guigné, Jacques Yves: "Acoustic Interrogations of Complex Seabeds" (Thesis, Doctor of Science)University of Bath, Bath, UK, Mar. 2013.
Guigné, Jacques Yves et al.: "Acoustic zoom high-resolution seismic beamforming for imaging specular and non-specular energy of deep oil and gas bearing geological formations", Journal of Natural Gas Science and Engineering 21, 2014, pp. 568-591.
Gutowski, Martin et al.: "3D high-resolution acoustic imaging of the sub-seabed", Applied Acoustics 69, 2008, pp. 262-271.
Guyonic, Stéphane et Al.: "Buried mines detection and classification : 2D-SAS processing definition and experimental results", Oceans '02 MTS/IEEE. Presented at the Oceans '02 MTS/IEEE, 2002, pp. 468-473 vol. 1.
Hayes, Michael P. et al.: "Synthetic Aperture Sonar: A Review of Current Status", IEEE Journal of Oceanic Engineering, vol. 34, No. 3, Jul. 2009m, pp. 207-224.
Hodges, R.P .: "Underwater Acoustics: Analysis, Design, and Performance of Sonar", John Wiley & Sons, 2010, Chapter 3, pp. 23-62.
Karimpouli, Sadegh et al.: "Automated diffraction delineation using an apex-shifted Radon transform", 2015, J. Geophys. Eng. 12, 199-209.
Kanasewich, Ernest R. et al.: "Imaging discontinuities on seismic sections", Geophysics, vol. 53, No. 3, Mar. 1988, p. 34-345.
Moser, T.J. et al.: "Diffraction imaging in depth", Geophysical Prospecting, 2008, 56, pp. 627-641.
Berkovich, Alex et al:: "Diffraction imaging by multifocusing", Geophysics, vol. 74, No. 6, Nov.-Dec. 2009, p. WCA75-WCA81.
Papenmeier, Svenja et al.: "Detection of Stones in Marine Habitats Combining Simultaneous Hydroacoustic Surveys", Geosciences 2018, 8, 279, pp. 1-14.
Plets, R.M.K. et al.: "3D reconstruction of a shallow archaeological site from high-resolution acoustic imagery: The Grace Dieu", Applied Acoustics, The detection of buried marine targets, 69, 2018, available online Jun. 8, 2017, pp. 399-411.
Plets, Ruth M.K. et al.: "The use of a high-resolution 3D Chirp sub-bottom profiler for the reconstruction of the shallow water archaeological site of the Grace Dieu (1439), River Hamble, UK", Journal of Archaeological Science 36, 2009, pp. 408-418.
Wu, R.S. et al.: "Elastic Wave Scattering by a Random Medium and the Small-Scale Inhomogeneities in the Lithosphere", Journal of Geophysical Research, vol. 90, No. B12, pp. 10,261-10,273, Oct. 10, 1985.
Richards, Adrian F.: "Review of continental shelf marine geotechnics: Distribution of soils, measurement of properties, and environmental hazards", Marine Geotechnology, 1:1,1975, pp. 33-67.
Tinkle, M.D. et al.: "Synthetic aperture sonar point response for buried objects",MTS/IEEE Oceans 2001. An Ocean Odyssey. Conference Proceedings (IEEE Cat. No. 01CH37295). Presented at the MTS/IEEE Oceans 2001, , vol. 1, pp. 225-233.
Vardy, Mark E. et al.: "Decimeter-resolution 3D seismic volume in shallow water: A case study in small-object detection", Geophysics, vol. 73, No. 2, Mar.-Apr. 2008, pp. B33-B40.
Vardy, Mark E. et al.: "Multidisciplinary investigation of a shallow near-shore landslide, Finneidfjord, Norway", Near Surface Geophysics, 2012, 10.
Yasseri, Sirous: "Drilling Risk Identification, Filtering, Ranking and Management," 6th International Offshore Industries Conference, May 4 and 5, 2015, Teheran Sharif University of Technology.
Yilmaz, Özdogan, "Seismic Data Analysis," Soc. of Exploration Geophysicists (1987), vol. I, Chapter 4-4.2, pp. 463-520.
Zakharia, Manell E.: "Combined parametric synthetic and interferometric sonar for the detection of buried objects", Europe Oceans 2005. Presented at the Europe Oceans 2005, pp. 522-526 vol. 1.
Clarke, John E. Hughes, "Data Handling Methods and Target Detectgion Results for Multibeam and Sidescan Data Collected as Part of the Search for SwissAir Flight 111," Shallow Water Survey Conference (SWS) 204 (1999) [https://scholars.unh.edu/ccom/204].
Gardline, "UXO Surveys," Gardline (Sep. 8, 2018) http://www.gardline.com:80/activities/service/uxo-surveys/ [https://web.archive.org/web/20180908181046/http://www.gardline.com:80/activities/service/uxo-surveys/].
Gardline, "2D Seismic Geophysics," Gardline (Sep. 13, 2019) http://www.gardline.com/activities/service/2d-seismic-geophysics/ [https://web.archive.org/web/20190913151711/http://www.gardline.com/activities/service/2d-seismic-geophysics/].
Gardline, "High Resoution 3D Seismic," Gardline Jan. 19, 2019) http://www.gardline.com/activities/service/high-resolution-3d-seismic/ [https://web.archive.org/web/20190119041139/http://www.gardline.com/activities/service/high-resolution-3d-seismic].
Teledyne Reson, "ParaSound Deep-Sea Parametric Sub-Bottom Profiler," Teledyne RESON (2018), http://www.teledynemarine.com/parasound-sub-bottom-profilers.
Kongsberg, "Sub Bottom Profiler—SBP 120/300," Kongsberg Gruppen ASA (Mar. 15, 2017) http://www.km.kongsberg.com/ks/web/nokbg0240.nsf/AllWeb/EF54BDEF668D0CABC1256CAE00303701?OpenDocument [https://web.archive.org/web/20150823024656/http://www.km.kongsberg.com/ks/web/nokbg0240.nsf/AllWeb/EF54BDEF668D0CABC1256CAE00303701?OpenDocument].

(56) References Cited

OTHER PUBLICATIONS

Backwell, George, "Kongsberg Deliver GeoChirp 3D Subsea Proviler to China," Marine Technology News (May 6, 2014), https://www.marinetechnologynews.com/news/kongsberg-deliver-geochirp-subsea-491519.

Dea, "Seismics," DEA Deutsche Erdoel AG (Apr. 22, 2019) http://www.dea-group.com/en/technology/exploration/seismik [https://web.archive.org/web/20180422054640/http://www.dea-group.com/en/technology/exploration/seismik].

NCS Subsea PCable, "NCS SubSea PCable", NCS P-Cable 3D Seismic AS (Jan. 24, 2019), http://pcable.com/default.dmx [https://web.archive.org/web/20190124032842/http://pcable.com/default.dmx].

PGS, "Towed Streamer Seismic," PGS Geophysical AS, (Dec. 30, 2018) https://www.pgs.com/marine-acquisition/services/towed-streamer-seismic/ [https://web.archive.org/web/20181230171644/https://www.pgs.com/marine-acquisition/services/towed-streamer-seismic/].

Pangeo Subsea, "Sub-Bottom Imager," PanGeo Subsea Inc. (Mar. 12, 2018), https://www.pangeosubsea.com/sub-bottom-imager/ [https://web.archive.org/web/20180312163953/https://www.pangeosubsea.com/sub-bottom-imager/].

Pangeo Subsea, "Acoustic Corer," PanGeo Subsea Inc. (Mar. 25, 2019), https://www.pangeosubsea.com/acoustic-corer/ [https://web.archive.org/web/20190325202346/https://www.pangeosubsea.com/acoustic-corer/].

Fugro, "Geowing," Fugro N.V. (Apr. 13, 2017), https://www.fugro.com/about-fugro/our-expertise/innovations/geowing [https://web.archive.org/web/20170413113145/https://www.fugro.com/about-fugro/our-expertise/innovations/geowing].

Marum, "Free-Fall Probes," Universität Bremen https://www.marum.de/en/about-us/Marine-Geotechnics.html (last visited Aug. 8, 2021).

International Association of Oil and Gas Producers; "OGP Guidelines for the Conduct of Offshore Drilling Hazard Site Surveys," OGP Report No. 272-18-1 (Apr. 2011) [http://www.ieco.org/Documents/OGP%20Site%20Survey%20Guidelines.pdf].

Landa, Evgeny et al., Seismic Monitoring of Diffraction Images for Detection of Local Heterogeneties, 63 Geophysics 1093 (May 1998) [https://doi.org/10.1190/1.1444387].

Sturzu, I. et al., Diffraction Imaging Using Specularity Gathers, Journal of Seismic Exploration 23, 1-18 (May 30, 2013).

Aki, Keiiti et al., "Scattering and Attenuations of Seismic Waves," 128 Pure and Applied Geophysics (1998).

Bansal, Reeshidev et al.: "Diffraction enhancement in prestack seismic data", Geophysics, vol. 70, No. 3, May-Jun. 2005, p. V73-V79.

Yilmaz, Özdogan, "Seismic Data Analysis," Soc. of Exploration Geophysicists (1987), vol. I, Chapter 7.2, pp. 1030-1072.

\* cited by examiner

Front view

Top view

Sideview

SYSTEM, METHOD, AND PROCESSING MODULE FOR DETECTING ONE OR MORE OBJECTS IN THE SEABED

TECHNICAL FIELD

Embodiments relate to a system, to methods, and to a processing module for detecting one or more objects in the seabed, wherein the detection of the one or more objects is based on the scattering of the at least one acoustic signal at the one or more objects.

BACKGROUND

The localization of objects of various sizes in marine sediments is in many cases a prerequisite for the construction of marine infrastructure as well as for the economic use of the seabed, e.g., wind turbines, pipelines, platforms, cable routes, drilling. Such objects may be glacial erratics or other geological inhomogeneities, but also UneXploded Ordnance, UXO, that lie in the uppermost sediment layers. Glacial erratics, for example, are a problem, e.g., in the Quaternary deposits of the North and Baltic Seas and generally in many shallow sea areas of temperate and higher latitudes, whereas UXO, for example, are found in the North and Baltic Seas. Conventional methods for subsurface exploration like 2D/3D reflection seismology, high resolution acoustics as well as magnetics show different limitations for object detection in sediments.

The localization of objects in marine sediments is a task in the development of offshore infrastructure (infrastructure built on the seabed away from the coast) that may often only be solved insufficiently using conventional methods.

SUMMARY

In at least some embodiments, the invention described herein may detect, locate, and characterize objects and inhomogeneities of various sizes in marine sediments by highly accurate recording of the scattered portion of the wave field after excitation by an acoustic source.

The invention is based on using the scattering of at least one acoustic signal at the one or more objects to detect the one or more objects. To be able to take advantage of this effect, the acoustic signal is selected to match the size of the objects to be detected, so that the wavelength of the acoustic signal is approximately in the same size range as the size of the objects themselves. This acoustic signal is emitted towards the seabed, where it is scattered at the objects to be detected in the seabed. This scattering is picked up by a plurality of receivers (along with the reflection of the acoustic signal, for example) and forwarded to a processing module for processing. Here, the processing may take place immediately following the capture, or data provided by the receivers may be recorded and evaluated by the processing module at a later point in time. The processing module is now configured to evaluate the data generated by the receivers, separating the portion of that data based on the scattering of the acoustic signal at the one or more objects, and based on this isolated data, detecting the one or more objects in the seabed. Due to the large wavelengths used, and therefore low frequencies, the acoustic signal may penetrate far into the seabed, allowing detection of one or more objects many meters beneath the seabed.

Embodiments therefore create a system for detecting one or more objects in the seabed. The system comprises an attachment structure. The attachment structure is intended to mechanically couple a signal source and a plurality of receivers to a vessel or to a propulsion unit. In this respect, the attachment structure may be approximately one-piece, i.e., designed to mechanically couple both the signal source and the plurality of receivers together in a coherent structure. Alternatively, the attachment structure may be multi-part, i.e., comprising at least two components, such as a component for the signal source and a component for the plurality of receivers. The system comprises the signal source configured to emit at least one acoustic signal towards the seabed. A wavelength of the acoustic signal is adapted to an expected size of the one or more objects. The system comprises the plurality of receivers. A distance between adjacent receivers is at most half the wavelength of the acoustic signal. The plurality of receivers is configured to generate a receiver signal based on a scattering of the at least one acoustic signal at the one or more objects. The system comprises a processing module configured to detect the one or more objects based on the receiver signal. The detection of the one or more objects is based on the scattering of the at least one acoustic signal at the one or more objects.

By adapting the wavelength of the acoustic signal to the size of the objects to be detected, as well as arranging the receivers with a maximum distance of half a wavelength, it is possible to detect the one or more objects in the seabed based on the scattering of the acoustic signal at the objects, which enables their detection many meters beneath the seabed, as well as enabling detection of objects that are arranged laterally offset from the receivers.

For example, the receivers of the plurality of receivers may be arranged in a regular or irregular grid. The processing module may be configured to detect, based on the scattering of the acoustic signal at the one or more objects, the one or more objects both below the grid and offset from the grid. For this purpose, the at least one signal source may be an omnidirectional signal source. In other words, the at least one signal source is configured to emit the acoustic signal such that a sound pressure reduction of 3 dB at 45° is not exceeded. By using the scattering of the acoustic signal to detect the objects in embodiments, a larger area, which may also be off the grid, may be checked at once.

For example, the grid may have a first expansion direction and a second expansion direction. The first expansion direction may be defined along an intended direction of movement of the attachment structure, and the second expansion direction may be defined orthogonally to the intended direction of movement of the attachment structure (i.e., transversely to the intended direction of movement).

The at least one signal source may be located at different locations, such as independently from the plurality of receivers or embedded in the grid of the plurality of receivers. In other words, the at least one signal source may be arranged in an extension of the first and/or the second expansion direction relative to the plurality of receivers. The signal source may also be at an angle to the frame, i.e., in extension of both expansion directions. For example, the signal source may be arranged independently from the plurality of receivers, allowing greater flexibility in the selection of signal sources and the arrangement of the individual components. Alternatively, the at least one signal source may be arranged within the grid in which the receivers of the plurality of receivers are arranged. This allows the grid to be used to accommodate the signal source as well.

In some embodiments, a so-called synthetic aperture may be used, i.e., a number of receivers in the direction of movement may be synthetically increased by emitting a plurality of acoustic signals. For example, an aperture, i.e., a (spatial) extension of the grid in the second expansion direction may be at least 25% greater than an aperture of the grid in the first expansion direction. The signal source may be configured to emit a plurality of acoustic signals in a predefined time sequence towards the seabed. The receiver signal may be based on a scattering of the plurality of acoustic signals at the one or more objects. The processing module may be configured to detect the one or more objects based on the scattering of the plurality of acoustic signals at the one or more objects. Thus, the plurality of acoustic signals may be used to artificially increase the effective aperture of the grid in the direction of movement by signal processing.

The wavelength of the acoustic signal may correspond to at least 10% of the expected size of the one or more objects. Alternatively, or additionally, the wavelength of the acoustic signal may be at most 1000% of the expected size of the one or more objects. If such a wavelength is selected, large angle diffraction (German Weitwinkelstreuung) may occur, which may be used to detect the one or more objects.

For example, the plurality of receivers may be arranged in a regular grid, such as a system of logical columns and rows. For example, the plurality of receivers may be arranged in a multi-dimensional lattice structure (also referred to as an array). In other words, the plurality of receivers may be arranged in the first expansion direction in a plurality of logical columns. The plurality of receivers may be arranged in the second expansion direction in a plurality of logical lines. The distance between adjacent receivers of the plurality of receivers may be defined in the first expansion direction by an average distance between adjacent columns of the plurality of columns. The distance between adjacent receivers of the plurality of receivers in the second expansion direction may be defined by an average distance between adjacent lines of the plurality of lines. A regular arrangement allows for a higher resolution than other arrangements.

Alternatively, the plurality of receivers may not be arranged in a multidimensional lattice structure. For example, the plurality of receivers may be arranged in a spiral structure, or in a grid based on an improved random method. This allows for improved signal amplification, for example in grids where the distance between the receivers and the center of the grid is not repeated.

The attachment structure may be implemented in a variety of ways. For example, the multi-dimensional lattice structure may be arranged on a rigid frame of the attachment structure. This allows for precise measurement of the receivers, such as via GPS (Global Positioning System).

Alternatively, the receivers may be attached to chains. In some embodiments, the system may further comprise a vessel. The plurality of chains may be attached to the vessel. Alternatively, the multidimensional lattice structure may be attached to a rigid traction unit of the attachment structure (external to a vessel). The plurality of logical columns may be configured as a plurality of chains of receivers. The receivers of one logical row of the plurality of logical rows may be coupled together by one or more rigid cross-connections. This allows the transverse distances between the receivers to be observed. Alternatively, the attachment structure may comprise at least one otter board. The receivers of one logical row of the plurality of logical rows may be coupled together by one or more flexible cross-connections. The at least one otter board, in interaction with the flexible cross-connections, may be designed to span the plurality of chains of receivers in a predefined spatial expansion.

After emitting the acoustic signal, in many embodiments the receiver signal may be based not only on the scattering of the acoustic signal, but also on a reflection of the acoustic signal. These two signal portions may subsequently be separated by the processing module. In other words, the receiver signal may comprise a first signal portion based on the scattering of the at least one acoustic signal at the one or more objects. The receiver signal may comprise a second signal portion based on a reflection of the at least one acoustic signal. The processing module may be configured to separate the first signal portion from the second signal portion, and to detect the one or more objects based on the first signal portion. The processing module may be configured to determine a piece of information about a distance of the one or more objects based on the second signal portion (and based on the first signal portion) for those objects located below the grid. Thus, the first signal portion may be used to detect the one or more objects, such as an angle of an offset of the one or more objects from the signal source, and the second signal portion may be used to determine the distance to the one or more objects (at least if they are below the receivers).

In some embodiments, the system comprises at least one further signal source configured to emit at least one further acoustic signal towards the seabed. A wavelength of the further acoustic signal may be at least 10% smaller or larger than the wavelength of the acoustic signal. Alternatively, the further acoustic signal may have substantially the same wavelength as the acoustic signal. The further signal source may be configured to emit the further acoustic signal at a time offset to the acoustic signal. For example, objects of which sizes lie in different size ranges may be detected at a time offset. If the wavelengths are the same, a repetition rate for emitting the acoustic signals may be increased.

Embodiments further create a processing module for detecting one or more objects in the seabed. The processing module is configured to obtain a piece of information about at least one acoustic signal of an acoustic signal source. A wavelength of the acoustic signal may be adapted to an expected size of the one or more objects. The processing module is configured to obtain a receiver signal from a plurality of receivers. The receiver signal is based on a scattering of the at least one acoustic signal at the one or more objects. The processing module is configured to detect the one or more objects based on the receiver signal. The detection of the one or more objects is based on the scattering of the at least one acoustic signal at the one or more objects.

Embodiments therefore create a method for detecting one or more objects in the seabed. The method comprises emitting an acoustic signal by an acoustic signal source. A wavelength of the acoustic signal is adapted to an expected size of the one or more objects. The method further comprises generating a receiver signal by a plurality of receivers. A distance between adjacent receivers is at most half the wavelength of the acoustic signal. The receiver signal is based on a scattering of the at least one acoustic signal at the one or more objects. The method further comprises detecting the one or more objects based on the receiver signal. The detection of the one or more objects is based on the scattering of the at least one acoustic signal at the one or more objects.

BRIEF DESCRIPTION OF THE FIGURES

Some examples of devices and/or methods will be described in the following by way of example only and with reference to the accompanying Figures, in which.

DESCRIPTION

Various examples will now be described in more detail with reference to the accompanying Figures in which some examples are illustrated. In the Figures, the thicknesses of lines, layers and/or areas may be exaggerated for clarity.

Accordingly, while further examples are capable of various modifications and alternative forms, some particular examples thereof are shown in the Figures and will subsequently be described in detail. However, this detailed description does not limit further examples to the particular forms described. Further examples may cover all modifications, equivalents, and alternatives falling within the scope of the disclosure. Same or like numbers refer to like or similar elements throughout the description of the Figures, which may be implemented identically or in modified form when compared to one another while providing for the same or a similar functionality.

It will be understood that when an element is referred to as being "connected" or "coupled" to another element, the elements may be directly connected or coupled via one or more intervening elements. If two elements A and B are combined using an "or", this is to be understood to disclose all possible combinations, i.e., only A, only B as well as A and B, unless explicitly or implicitly defined otherwise. An alternative wording for the same combinations is "at least one of A and B" or "A and/or B". The same applies, mutatis mutandis, for combinations of more than two Elements.

The terminology used herein for the purpose of describing particular examples is not intended to be limiting for further examples. Whenever a singular form such as "a," "an," and "the" is used and using only a single element is neither explicitly or implicitly defined as being mandatory, further examples may also use plural elements to implement the same functionality. If a function is described below as being implemented using multiple elements, further examples may implement the same function using a single element or a single processing entity. It will be further understood that the terms "comprises", "comprising", "includes" and/or "including," when used, specify the presence of the stated features, integers, steps, operations, processes, elements, components and/or any group of the same, but do not preclude the presence or addition of one or more other features, integers, steps, operations, processes, elements, components and/or any group thereof.

Unless otherwise defined, all terms (including technical and scientific terms) are used herein in their ordinary meaning of the art to which the examples belong.

Figure 1A:
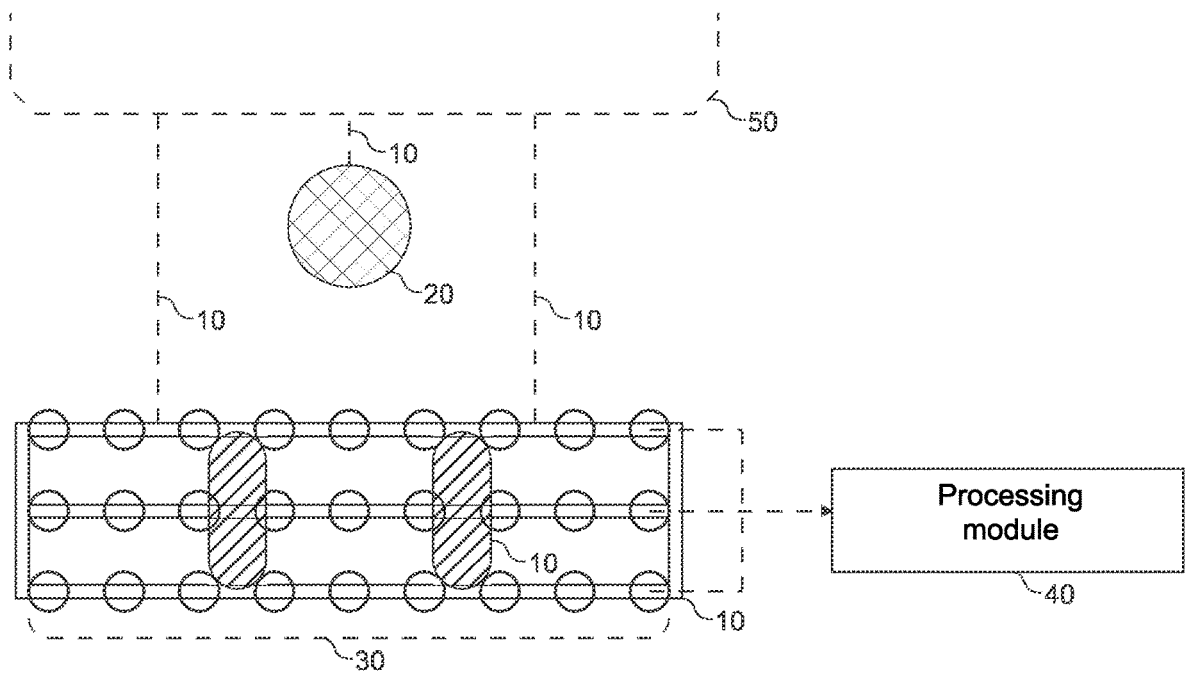
FIG. 1a shows a schematic diagram of a system for detecting one or more objects in the seabed, and of a processing module of such a system.

FIG. 1a shows a flow diagram of a system 100 for detecting one or more objects in the seabed. The system comprises an attachment structure 10. The attachment structure is intended to mechanically couple a signal source 20 and a plurality of receivers 30 to a vessel or to a propulsion unit. The system 100 further comprises the signal source 20 configured to emit at least one acoustic signal towards the seabed. A wavelength of the acoustic signal is adapted to an expected size of the one or more objects. The system further comprises the plurality of receivers 30. A distance between adjacent receivers is at most half the wavelength of the acoustic signal. The plurality of receivers is configured to generate a receiver signal based on a scattering of the at least one acoustic signal at the one or more objects. The system comprises a processing module 40 configured to detect the one or more objects based on the receiver signal. The detection of the one or more objects is based on the scattering of the at least one acoustic signal at the one or more objects.

Figure 1B:
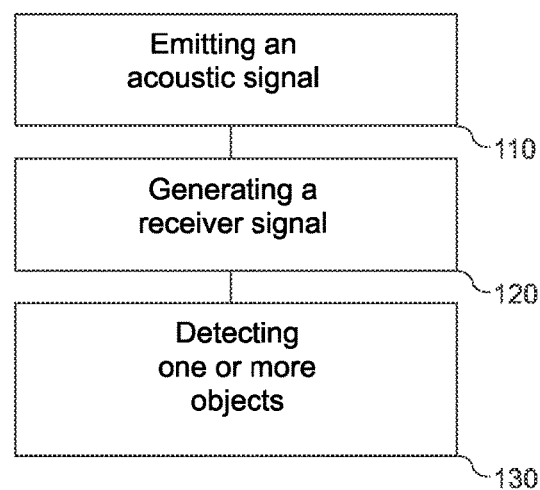
FIG. 1b shows a flow diagram of a method for detecting one or more objects in the seabed.

FIG. 1b shows a flow chart of a (corresponding) method for detecting one or more objects in the seabed. The method comprises emitting 110 an acoustic signal by an acoustic signal source. A wavelength of the acoustic signal is adapted to an expected size of the one or more objects. The method further comprises generating 120 a receiver signal by a plurality of receivers. A distance between adjacent receivers is at most half the wavelength of the acoustic signal. The receiver signal is based on a scattering of the at least one acoustic signal at the one or more objects. The method further comprises detecting 130 the one or more objects based on the receiver signal. The detection of the one or more objects is based on the scattering of the at least one acoustic signal at the one or more objects.

The following description relates to both the system of FIG. 1a, the method of FIG. 1b, and the processing module 40 in isolation. In this respect, features of the system may also be implemented in the method and/or by the processing module, and vice versa.

Present embodiments relate to a system and a method for detecting one or more objects in the seabed, as well as to individual components of such a system, and the methods performed by such components. For example, the system is here intended to detect objects underneath a seabed, such as objects located, for example, in the sediment of the seabed. For example, the system may be designed to detect the one or more objects within 10 m (or within 15 m, within 20 m) beneath the seabed. For example, a detection depth of the system may protrude at least 10 m (or at least 15 m, at least 20 m) into the seabed. The one or more objects may be, for example, (large, isolated) pieces of rock, such as glacial erratics, which are located in the seabed. In other embodiments, the one or more objects may, for example, be ammunition that has not exploded, so-called unexploded ordnance (UXO). These objects may pose a risk, for example, if structures such as wind turbines or drilling platforms are to be built in the seabed on foundations that protrude into the seabed. To detect these objects, embodiments, unlike other approaches, do not use reflections caused by a signal source on the objects, but use the scattering of an acoustic signal at the respective objects. To take advantage of these scattering effects, the wavelength of the acoustic signal used for detection is matched to the size of the objects to be detected. To obtain large angle diffraction on which detection may be based, the wavelength of the acoustic signal may be of the same order of magnitude as the size of the objects themselves.

The system comprises the attachment structure 10. In this context, the term "attachment structure" does not necessarily stand for a coherent structure. For example, the attachment structure may comprise a first substructure designed to mechanically couple the at least one signal source to the vessel or propulsion unit, and the attachment structure may comprise a second substructure designed to mechanically couple the plurality of receivers to the vessel or propulsion unit. The first and second substructures may be mutually decoupled, i.e., they may be carried out to be non-contiguous. For example, the attachment structure may comprise a (fixed) frame to which the plurality of receivers is attached. The signal source may or may not be mechanically coupled to the frame, but may be mechanically coupled to the vessel or propulsion unit independently. Alternatively, the attachment structure may be carried out to be contiguous, such as also mechanically coupling the at least one signal source to the plurality of receivers.

The attachment structure is intended to mechanically couple the signal source 20 and the plurality of receivers 30 to the vessel or to the propulsion unit. Consequently, the system may also comprise the vessel or the propulsion unit. The vessel may, for example, be a survey vessel. The attachment structure may be designed to be towed by the vessel. Alternatively, the system may be self-propelled without a vessel, i.e., may also comprise the propulsion unit which may be configured to move the system over the sea surface remotely or according to a predetermined pattern (such as in interaction with a control unit). The propulsion unit may comprise corresponding propulsion and control components, such as a propulsion engine and the control unit.

In embodiments, the plurality of receivers is distributed over an area. This area forms the aperture of the plurality of receivers, i.e., the larger the area, the larger the aperture of the plurality of receivers. In the following, this area is referred to as a grid, but the term "aperture" may also be used synonymously. In this regard, the term "grid" does not imply that the plurality of receivers has necessarily to be arranged in a regular pattern, such as in a two-dimensional or three-dimensional lattice structure, this is merely an embodiment. Alternatively, other regular or irregular patterns may be considered, such as a spiral pattern or a(n) (improved pseudo-) random pattern. The grid may have a first expansion direction and a second expansion direction. The first expansion direction may be defined along an intended direction of movement of the attachment structure. The second expansion direction may be defined orthogonally (transversely) to the intended direction of movement of the attachment structure 10.

Thus, the receivers of the plurality of receivers 30 may be arranged in a regular or irregular grid forming the aperture of the plurality of receivers. The processing module may be configured to detect, based on the scattering of the acoustic signal at the one or more objects, the one or more objects both below the grid (the area, the aperture) and offset from the grid, such as at least 10° offset (or at least 20° offset, at least 30° offset, at least 45° offset). With a large aperture, the angle may be more than 45°.

The system further comprises the at least one signal source 20. The at least one signal source may here be arranged at different positions, such as outside the grid, or also within the grid. For example, the at least one signal source 20 may be arranged in an extension of the first or the second expansion direction relative to the plurality of receivers. Alternatively, the signal source may be arranged in any position adjacent to the grid. However, the at least one signal source may also be arranged within the grid. In other words, the at least one signal source 20 may be arranged within the grid in which the receivers of the plurality of receivers are arranged.

The at least one the signal source is configured to emit at least one acoustic signal towards the seabed. To this end, the at least one signal source may be arranged on the attachment structure such that, in use, the at least one signal source is underwater. In this respect, the at least one signal source may be an acoustic and/or seismic signal source, such as a GI gun (generator-injector gun), a sparker (sound source with electrical discharge), or a boomer (sound source that stores the energy in capacitors and delivers the same via a flat spiral coil so that water is displaced by an adjacently arranged copper plate). The terms acoustic and seismic may be used interchangeably here as the present approach uses wavelengths that may be allocated to both acoustic and seismic signals. Thus, in another reading, the acoustic signal may also be a seismic signal. The at least one signal source 20 may be an omnidirectional signal source. In other words, the at least one signal source 20 is configured to emit the acoustic signal such that a sound pressure reduction of 3 dB at 45° (compared to a normal that emanates from the at least one signal source) is not exceeded.

The wavelength of the acoustic signal is adapted to an expected size of the one or more objects. For example, the expected size of the one or more objects may be a value specified by the target of the detection. If, for example, glacial erratics are to be found, a different wavelength may be used than in a case where ammunition is to be found or, for example, a sunken vessel. Thus, the wavelength of the acoustic (or seismic) signal may be in the same range as the expected size of the one or more objects themselves. The wavelength of the acoustic signal may correspond to at least 10% (or at least 20%, at least 30%, at least 50%) of the expected size of the one or more objects. The wavelength of the acoustic signal may, for example, correspond to at most 1000% (or at most 800%, at most 500%) of the expected size of the one or more objects. The present system and method may be used in many cases to detect rather larger objects, such as glacial erratics or unexploded ordnance. For example, the wavelength of the acoustic signal may be approximately at least 50 cm (or at least 80 cm, at least 100 cm, at least 150 cm). The system may also comprise several signal sources which emit the acoustic signal with the same wavelength, for example in order to achieve a faster sequence in the emission of several acoustic signals, for example when using a synthetic aperture.

Different wavelengths may also be used at a time offset in a detection process, for example by emitting correspondingly a plurality of acoustic signals at a time offset through the signal sources. Thus, the system may comprise at least one further signal source configured to emit at least one further acoustic signal towards the seabed. A wavelength of the further acoustic signal may be at least 10% (or at least 20%, at least 50%) smaller or larger than the wavelength of the acoustic signal. The further signal source may be configured to emit the further acoustic signal at a time offset to the acoustic signal. The wavelength of the further acoustic signal may also be adapted to the expected size of the one or more objects, for example if objects are to be detected that lie in different size ranges.

The system comprises the plurality of receivers 30. The receivers of the plurality of receivers may be, for example, hydrophones, which are microphones that may be used underwater to record or hear underwater sound. The plurality of receivers may be configured, for example, to capture a wavefront formed by scattering (and optionally also reflection) of the at least one acoustic signal at the one or more objects (and optionally at the seabed as well) and to generate the receiver signal based on the captured wavefront. Thus, the plurality of receivers is configured to generate the receiver signal at least based on a scattering of the at least one acoustic signal at the one or more objects. Receivers often capture both the scattering and the reflection of the acoustic signal. In these cases, the portions based on the scattering and the portions based on the reflection may be separated by the processing module. In other words, the receiver signal may comprise a first signal portion based on the scattering of the at least one acoustic signal at the one or more objects. The receiver signal may further comprise a second signal portion based on a reflection of the at least one acoustic signal. The processing module 40 may be configured to separate the first signal portion from the second signal portion. The processing module may further be configured to detect the one or more objects based on the first signal portion. The second signal portion may in turn be used to determine the distance of the one or more objects relative to the plurality of receivers, at least if they are located below the grid. Thus, the processing module may further be configured to determine a piece of information about a distance of the one or more objects (relative to the plurality of receivers and/or relative to the signal source) based on the second signal portion (and based on the first signal portion) for those objects located below the grid. Alternatively, the plurality of receivers may be configured to only capture the scattering of the acoustic signal at the one or more objects and generate the receiver signal based thereon.

The plurality of receivers may be arranged in any grid as long as at least the (average) distances between the receivers are at most as large as (or smaller than) half the wavelength of the acoustic signal (or smaller than half the shortest-wavelength signal in case of a plurality of acoustic signals). For example, to increase a resolution of the system, the plurality of receivers 30 may be arranged in a multi-dimensional (such as a two-dimensional or in a three-dimensional) lattice structure. In a three-dimensional lattice structure, for example, the receivers have to be calibrated, also based on their arrangement in the third dimension. Alternatively, the plurality of receivers 30 may not be arranged in a multidimensional lattice structure. In particular, the plurality of receivers may be arranged in a spiral structure, or in a(n) (improved pseudo-) random arrangement. In this respect, the distance between adjacent receivers (such as in the second expansion direction) may be at most as large as (or smaller than) 50% of the wavelength of the acoustic signal. If the grid of the plurality of receivers comprises more than one row of receivers (in the second expansion direction), the distance between adjacent receivers in the first expansion direction may also be as large as (or smaller than) 50% of the wavelength of the acoustic signal. A lower limit is defined here, for example, by the effort that needs to be made to increase the density of the recipients.

In this respect, the distance between the receivers may each be defined along one of the two expansion directions, i.e., the distance may be defined along the first expansion direction and/or the second expansion direction. For example, the plurality of receivers 30 may be arranged in the first expansion direction in a plurality of logical columns. The plurality of receivers 30 may be arranged in the second expansion direction in a plurality of logical lines. The distance between adjacent receivers of the plurality of receivers may be defined in the first expansion direction by an average (or maximum) distance between adjacent columns of the plurality of columns. The distance between adjacent receivers of the plurality of receivers in the second expansion direction may be defined by an average (or maximum) distance between adjacent lines of the plurality of lines.

The size of the aperture, i.e., of the grid, defines the resolution of the system. Therefore, an expansion of the grid in the second expansion direction may be at least two times (or at least three times, five times) a wavelength of the acoustic signal. An expansion of the grid in the second expansion direction, which is five times the wavelength of the acoustic signal, represents a good compromise between resolution and manageability. In the first expansion direction, the expansion of the grid may be smaller, for example in the case of a synthetic aperture. For example, an embodiment of the system may comprise a single line of receivers, and three or more rows of receivers. Again, by providing multiple rows, the resolution of the system may be increased. Upwards, the size of the aperture may be limited only by the manageability of the system.

The system further comprises the processing module 40 configured to detect the one or more objects based on the receiver signal. The detection of the one or more objects is based on the scattering of the at least one acoustic signal at the one or more objects.

In this respect, the detection may be performed either immediately after the receiver signal is generated or at a later point in time. Here, data may be stored at a first point in time, processing may be done later (at a second point in time), the latter does not necessarily have to happen at the time of recording. For example, the processing module or a control module of the plurality of receivers may be configured to store the receiver signal on a memory, such as a read-only memory or a tape memory. The processing module may be configured to read the receiver signal from the memory or to obtain the receiver signal from the memory and subsequently perform the detection of the one or more objects. For example, the processing module may be configured to perform the detection of the one or more objects after completion of a measurement run on land.

In order to be able to perform the detection, the receiver signal may be linked with high accuracy to a position of the receiver grid at the time when the receiver signal is generated. To enable this, the system may further comprise at least one global positioning system (GPS) receiver and (optionally) at least one motion sensor. In this respect, a control unit of the plurality of receivers, the processing module, or a recording module may comprise the GPS receiver and/or the motion sensor to link the receiver signal to the position of the plurality of receivers. In addition, a GPS receiver and (optionally) a motion sensor may be arranged at the signal source. Thus, the processing module or the recording module may be configured to also link the position of the signal source to the receiver signal, i.e., to store it together with the receiver signal.

In this regard, the processing module may be configured to determine one or more irregularities in the receiver signal, and to detect the one or more objects based on the one or more irregularities. In this respect, the processing module may be configured, for example, to determine an offset (such as an angle offset) of the one or more objects relative to a position of the at least one signal source and/or relative to a position of the plurality of receivers based on the receiver signal (such as based on the one or more irregularities).

Thus, embodiments create the processing module, as well as a method for a processing module in isolation. For example, the processing module is configured to obtain a piece of information about at least one acoustic signal of an acoustic signal source 20. A wavelength of the acoustic signal is adapted to an expected size of the one or more objects. For example, the processing module may be configured to control the at least one signal source, wherein the information about the at least one acoustic signal is based on the control of the at least one signal source. Alternatively, the processing module may only read information about an emitting time of the acoustic signal and/or information about the wavelength from a memory, such as a memory that also comprises the receiver signal, if the detection of the one or more objects is performed subsequently. The processing module is further configured to obtain the receiver signal from the plurality of receivers 30. In this respect, the processing module may be configured to obtain or to receive the receiver signal directly from the plurality of receivers, such as if the detection of the objects is performed directly. Alternatively, the processing module may be configured to read the receiver module from a memory. The receiver signal is based on the scattering of the at least one acoustic signal at the one or more objects. The receiver signal is further configured to detect the one or more objects based on the receiver signal. The detection of the one or more objects is based on the scattering of the at least one acoustic signal at the one or more objects.

A corresponding method comprises obtaining the information about the at least one acoustic signal of the acoustic signal source 20, wherein a wavelength of the acoustic signal is adapted to an expected size of the one or more objects. The method further comprises obtaining the receiver signal from the plurality of receivers 30, the receiver signal being based on the scattering of the at least one acoustic signal at the one or more objects. The method further comprises detecting the one or more objects based on the receiver signal, wherein the detection of the one or more objects is based on the scattering of the at least one acoustic signal at the one or more objects. Embodiments further create a program having a program code for executing the method when the program code is executed on a computer, a processor, a controller or a programmable hardware component.

In embodiments, the processing module 40 may correspond to any controller or processor or to a programmable hardware component. For example, the processing module 40 may also be implemented as a software programmed for a corresponding hardware component. Therefore, the processing module 40 may be implemented as a programmable hardware with accordingly matched software. Here, any processors may be used, such as digital signal processors (DSPs). In this context, embodiments are not restricted to a certain type of processor. Any processors or also a plurality of processors are conceivable for implementing the processing module 40. The processing module may further comprise, or be coupled to, an interface, wherein the interface may correspond to one or more inputs and/or one or more outputs for receiving and/or transmitting information, such as in digital bit values based on a code, within a module, between modules, or between modules of different entities.

In at least some embodiments, a synthetic aperture may be used, i.e., along the first expansion direction, the aperture may be artificially enlarged by emitting a plurality of acoustic signals, provided that this plurality of signals is accumulated to detect the one or more objects. For example, the (real, spatial) aperture of the grid in the second expansion direction may be at least 25% greater than the aperture of the grid in the first expansion direction. The effective aperture of the grid in the first expansion direction may be enlarged by using a synthetic aperture. In this respect, the synthetic aperture allows to compensate a potentially smaller expansion of the grid/lattice/array in the direction of movement by processing the data. Thus, the signal source 20 may be configured to emit a plurality of acoustic signals in a predefined time sequence towards the seabed. The receiver signal may be based on a scattering of the plurality of acoustic signals at the one or more objects. The processing module 40 may be configured to detect the one or more objects based on the scattering of the plurality of acoustic signals at the one or more objects.

Figure 6A:
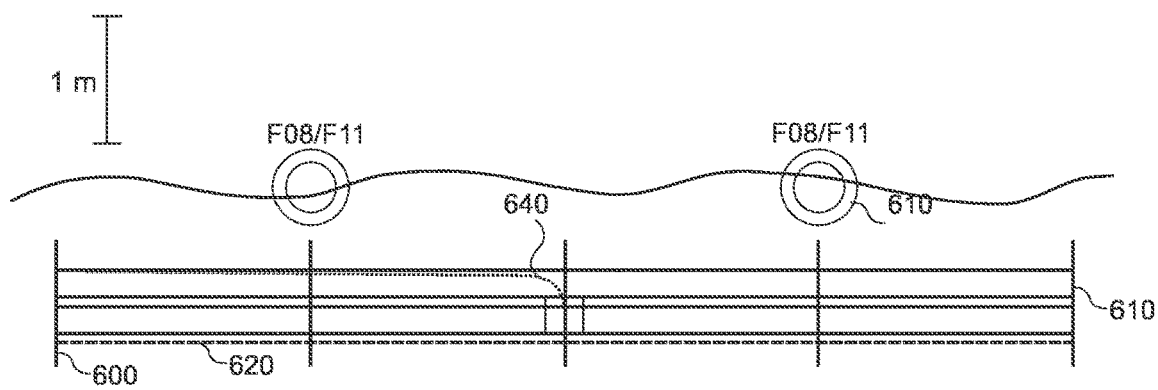
FIGS. 6a to 6b show schematic diagrams of a fixed, buoyant frame, with FIG. 6a showing a top view, FIG. 6b showing a front view, and FIG. 6c showing a side view.
Figure 6B:
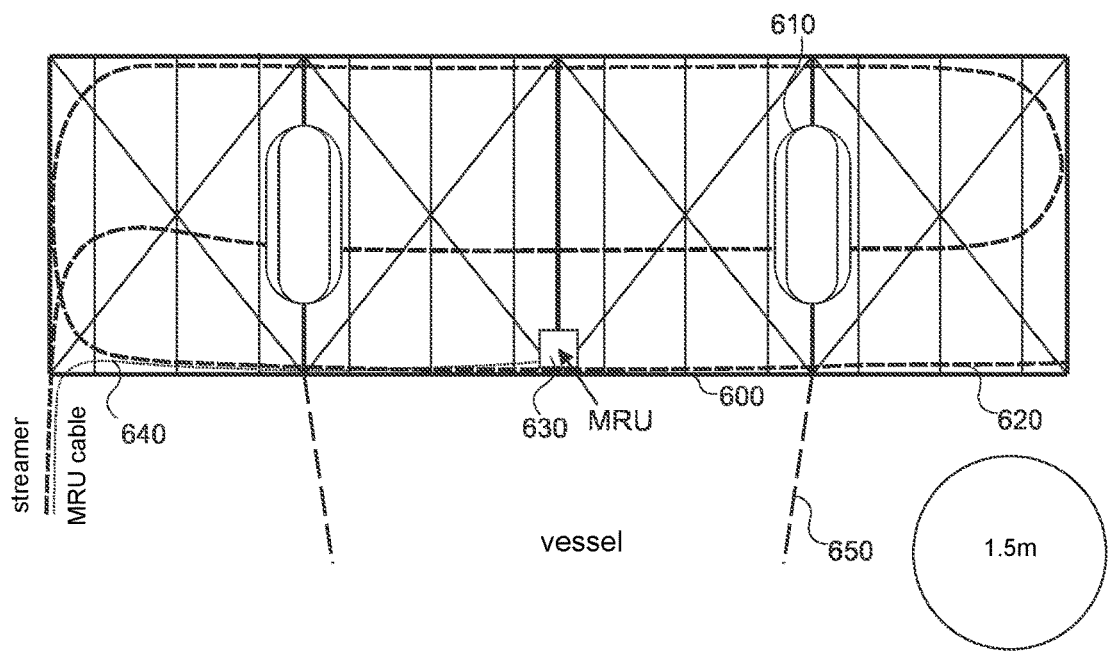

There are several ways to couple the plurality of receivers to the vessel or to the propulsion system through the attachment structure. For example, the plurality of receivers, such as the multi-dimensional lattice structure, or any other arrangement of receivers may be arranged on a rigid frame of the attachment structure 10, such as shown in FIGS. 6a to 6b. The rigid frame may, for example, be made of metal or a composite material.

In cases where the plurality of receivers 30 are arranged in a first expansion direction (such as the multidimensional lattice structure) in a plurality of logical columns, the multi-dimensional lattice structure may, for example, be attached to a rigid traction unit of the attachment structure, and the plurality of logical columns may be configured as a plurality of chains of receivers. Alternatively, the plurality of chains may be attached directly to the vessel, or be attached to the propulsion unit with the rigid traction unit.

In order to be able to observe the distances between the columns, the columns may be stabilized against each other. For example, the receivers of one logical row of the plurality of logical rows may be (mechanically) coupled to each other by one or more rigid cross-connections designed to effect the transverse distances between the logical columns. Alternatively, the transverse distances may also be achieved by other means. For example, the attachment structure 10, such as the second substructure of the attachment structure, may comprise at least one otter board, such as two otter boards. The receivers of one logical row of the plurality of logical rows may be coupled together by one or more flexible cross-connections. The at least one otter board, in interaction with the flexible cross-connections, may be designed to span the plurality of chains of receivers in a predefined spatial expansion.

In addition, the attachment structure may further comprise one or more buoys configured to keep the attachment structure at least partially above water, such that, for example, the at least one signal source and the plurality of receivers are submerged in use, but the attachment structure as such floats in the water and may be moved through the water behind the vessel (or with the propulsion unit).

In the following, the embodiments are supplemented by further examples. Thus, features described in connection with FIGS. 1a and 1b may be transferred to the embodiments of the following Figures, and vice versa. In this regard, the embodiments described in connection with FIGS. 1a and 1b may comprise one or more features described below.

At least some embodiments deal with a decoupled characterization of objects in the subsurface. To enable the detection and localization of objects in marine sediments, the backscattered portion of an emitted seismic signal (such as of the acoustic signal) may be recorded in sufficient spatial and temporal resolution (e.g., by the plurality of receivers to generate the receiver signal). For this purpose, a network of receivers (e.g., the plurality of receivers) optimized for the wavelength of the emitted seismic signal may be separately towed to a suitably selected seismic source (e.g., the signal source) (FIG. 2).

For this purpose, the wavelength of the source signal may be adapted to the assumed size of the objects to be detected, i.e., the point scatterers. For this purpose, various acoustic or seismic sources are available as signal sources, such as a GI gun (generator-injector gun), a sparker (sound source with electrical discharge), a boomer (sound source that stores the energy in capacitors and delivers the same via a flat spiral coil so that water is displaced by an adjacently arranged copper plate). An improvement of the receiver arrangement allows to avoid spatial alias effects, to improve the resolution across the traversed profile and to improve the possible signal amplification during further processing.

Figure 2:
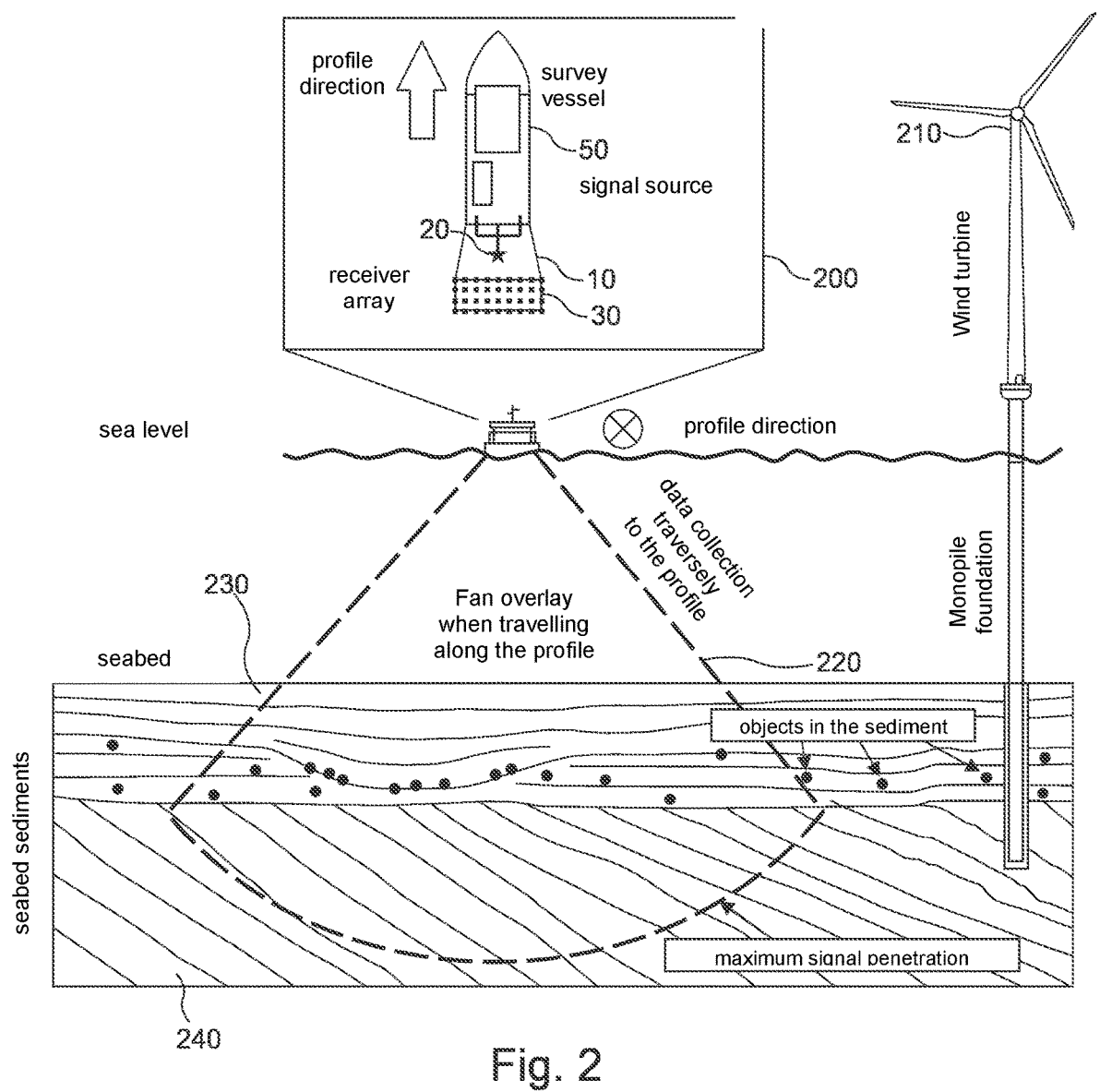
FIG. 2 shows a schematic sketch of a towing system with attachment structure, signal source and receiver array, for picking up scattered energy from objects in marine sediments.

FIG. 2 shows a schematic sketch of a towing system 200 having attachment structure 10, signal source 20, and receiver array 30 (such as the plurality of receivers arranged in a grid; in this context "array" may roughly be translated as "lattice structure") for picking up scattered energy from objects (e.g., glacial erratics) in marine sediments 230; 240. The attachment structure is attached to a survey vessel with the signal source and the receiver array. The large transverse extension of the array allows scattered signals to be recorded in a fan 220 along the profile and be evaluated for object detection. The fan 220 shows the maximum signal penetration of the emitted acoustic signal and the limit of the data collection traversely to the profile. Wind turbine 210, which has a so-called monopile foundation (foundation based on a single pier), thereby illustrates how the objects in the sediment may make foundation placement difficult.

Strong scattering of a seismic/acoustic signal may be expected if the wavelength of the generated, seismic source signal is in the same order of magnitude as the size of the scattering objects. Therefore, the ratio K/λ, of wavelength λ of an acoustic signal and the size of a body K may be in the range of 0.2 to 2 to achieve strong large angle diffraction (see FIG. 3), i.e., approximately the wavelength of the acoustic signal is adapted to the expected size of the one or more objects. For example, if scattering sources (such as the one or more objects) in the size range of 0.3 m to 3 m are the primary interest of an investigation, the wavelength may be 1.5 m, for example. This corresponds to a frequency of 1000 Hz under the assumption that the propagation speed is about 1500/s, which corresponds to the speed of sound in water.

Figure 3:
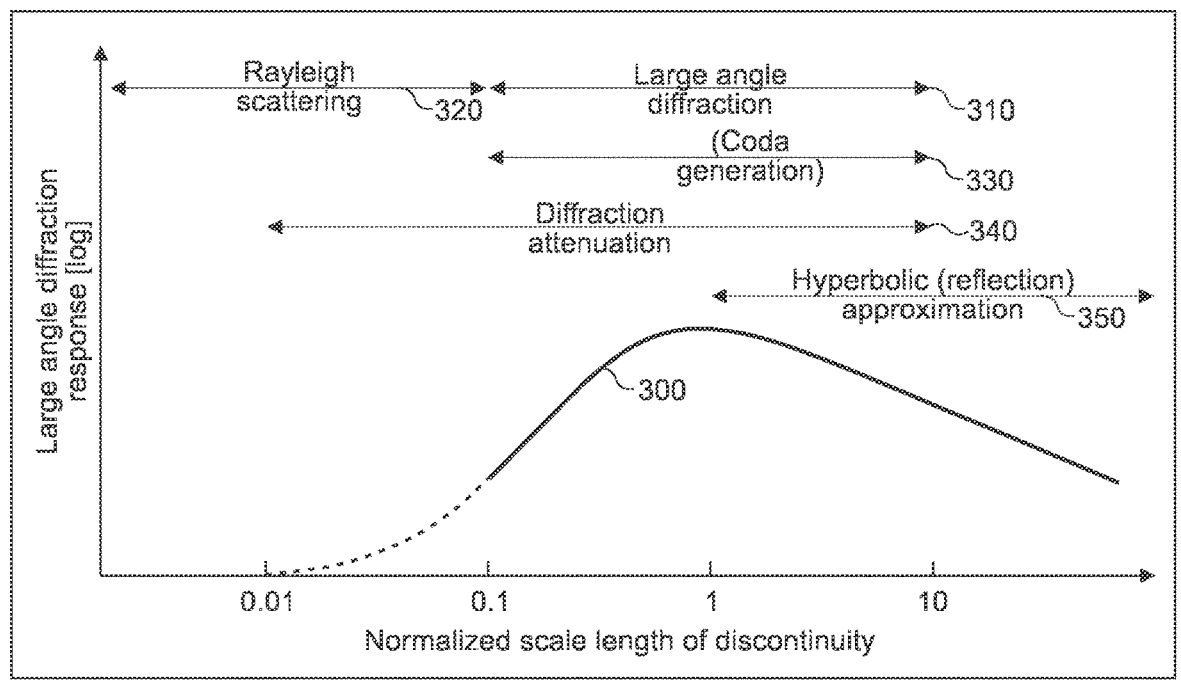
FIG. 3 shows a diagram of a diffraction regime and a large angle diffraction depending on the normalized length scale of a scattering object.

FIG. 3 shows a diffraction regime (310-350) and a strength 300 of a large angle diffraction depending on the normalized length scale of a scattering object, which corresponds to the ratio of wavelength λ of an acoustic signal and the size of a body A. Here, reference number 310 denotes the large angle diffraction, reference number 320 denotes Rayleigh scattering, reference number 330 denotes an emergence of Coda waves, reference number 340 denotes diffraction attenuation, and reference number 350 shows hyperbolic reflection approximation. Here, the x-axis denotes a normalized scale length of discontinuity, and the y-axis shows the large angle diffraction response (on a logarithmic scale).

When recording seismic data, aliasing may occur in space if the distance between the receivers is greater than half the wavelength of the signal to be received. A recorded wavefront may then possibly no longer be reconstructed precisely and a localization of, e.g., a point scatterer is not possible. Therefore, the solution shown here comprises that the distance of the receivers in the profile direction as well as traversely to it may be less than half the wavelength. The exact positioning of the receivers may be of great importance in many cases and may be implemented on a frame construction, for example. For precise positioning, a GPS may be used which determines the position and orientation of the receiver system (e.g., the plurality of receivers). To stay with the above example, the distance between two adjacent receivers may be less than 0.75 m in order to be able to image scattering sources in the size range of 0.3 m to 3 m well at a frequency of 1000 Hz and thus at a wavelength of 1.5 m.

Figure 4A:
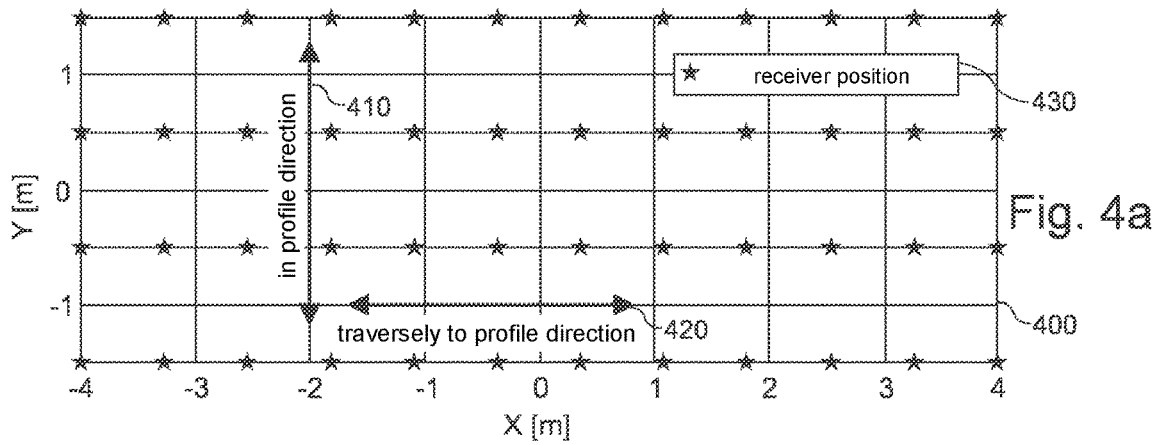
FIG. 4a shows a geometry of a towing array of an embodiment.

FIG. 4a shows a geometry of a towing array 400 (such as the attachment structure, with the plurality of receivers) according to one embodiment, designed for a source frequency of ~1000 Hz. In this regard, reference number 410 denotes the extension in the profile direction (such as in the first expansion direction, such as in the direction of intended movement of the attachment structure), reference number 420 denotes the extension transversely to the profile direction (such as in the second expansion direction, such as orthogonally to the direction of intended movement of the attachment structure), and reference number 430 denotes the receiver positions.

Figure 4B:
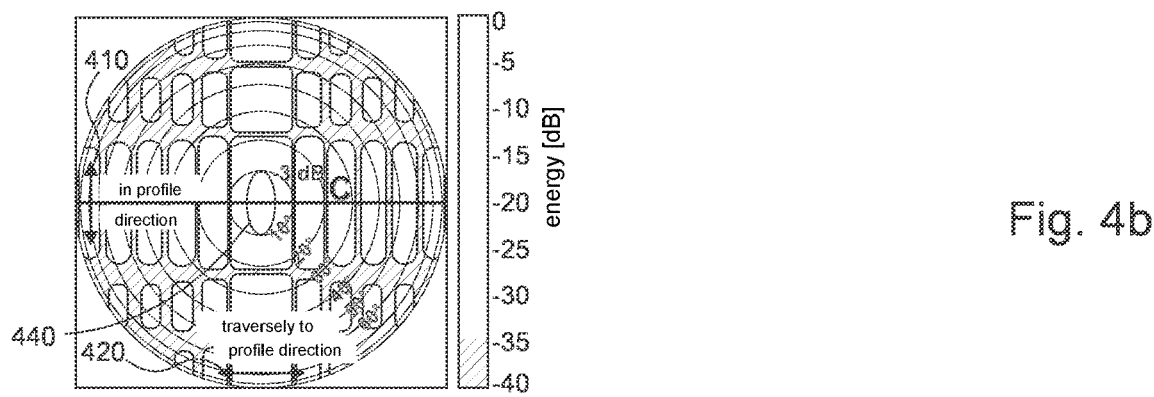
FIG. 4b shows a beam profile for the towing array.
Figure 4C:
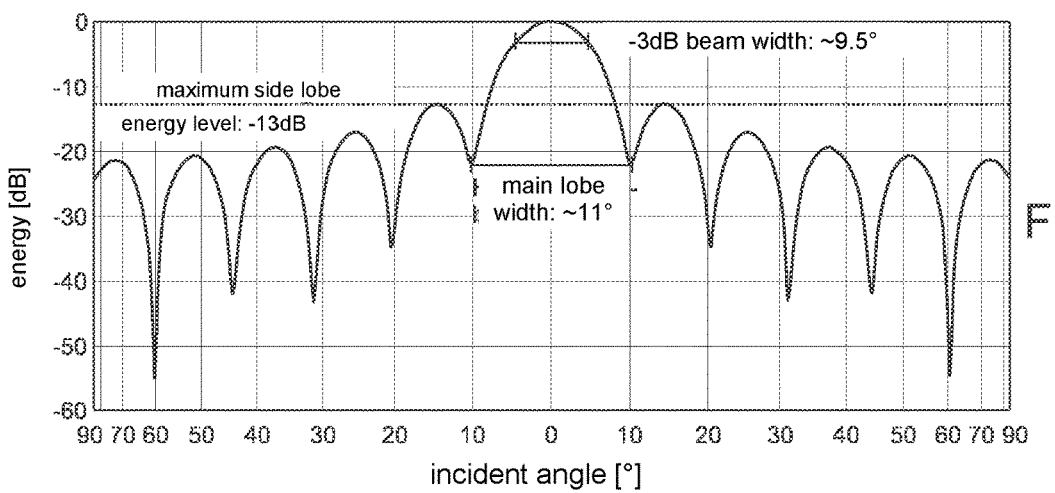
FIG. 4c shows a section through the beam profile.
Figure 4D:
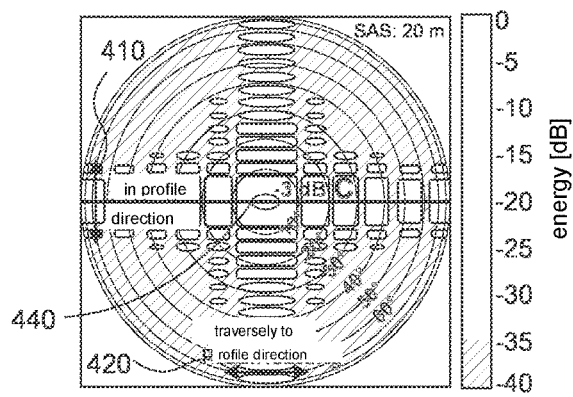
FIG. 4d shows another beam profile for the towing array using a synthetic aperture.

FIG. 4b shows a beam pattern for the array with a modeled wave front incident on the array from below. The −3 dB contour 440 shows the characteristic beam width of the system. In FIG. 4b (and in FIG. 4d), the incident angle is plotted in a circle around the center, with lighter shaded areas denoting higher energy (in dB) and darker areas denoting lower energy. FIG. 4c shows a section through the beam pattern transversely to the profile direction. Main and side lobes are clearly visible. In the present case, a beam width at −3 dB of ~9.5°, a main lobe width of ~11°, and a maximum side lobe energy level of −13 dB may be determined. In FIG. 4c, the incident angle (in degrees) is plotted on the x-axis and the energy (in dB) on the y-axis. FIG. 4d shows how an artificial enlargement of the array in the longitudinal direction (synthetic aperture array) may significantly improve the resolution in this direction.

Modeling studies have shown that the achievable lateral resolution transversely to the towing direction of the system depends directly on the extension of the area occupied by the receivers, i.e., the aperture of the array transversely to the towing direction. The resolution in transverse direction is in some cases more important than in the towing direction, as, along the recorded profile, the resolution may be increased by, e.g., increasing the firing rate of the seismic source. The lateral resolution here specifies, for example, the minimum distance between two point scatterers in order to be able to register these two objects as separate events. The so-called 'beam pattern' and thus important characteristics of an array such as the beam width may be calculated in at least some embodiments if the exact positions of the individual receivers are known (FIG. 3). Here, the beam width indicates the resolution of an array as the angle difference between two scattering bodies. Generally speaking, in at least some embodiments, the larger the aperture width is kept, the greater the resolution becomes (FIG. 5).

Figure 5:
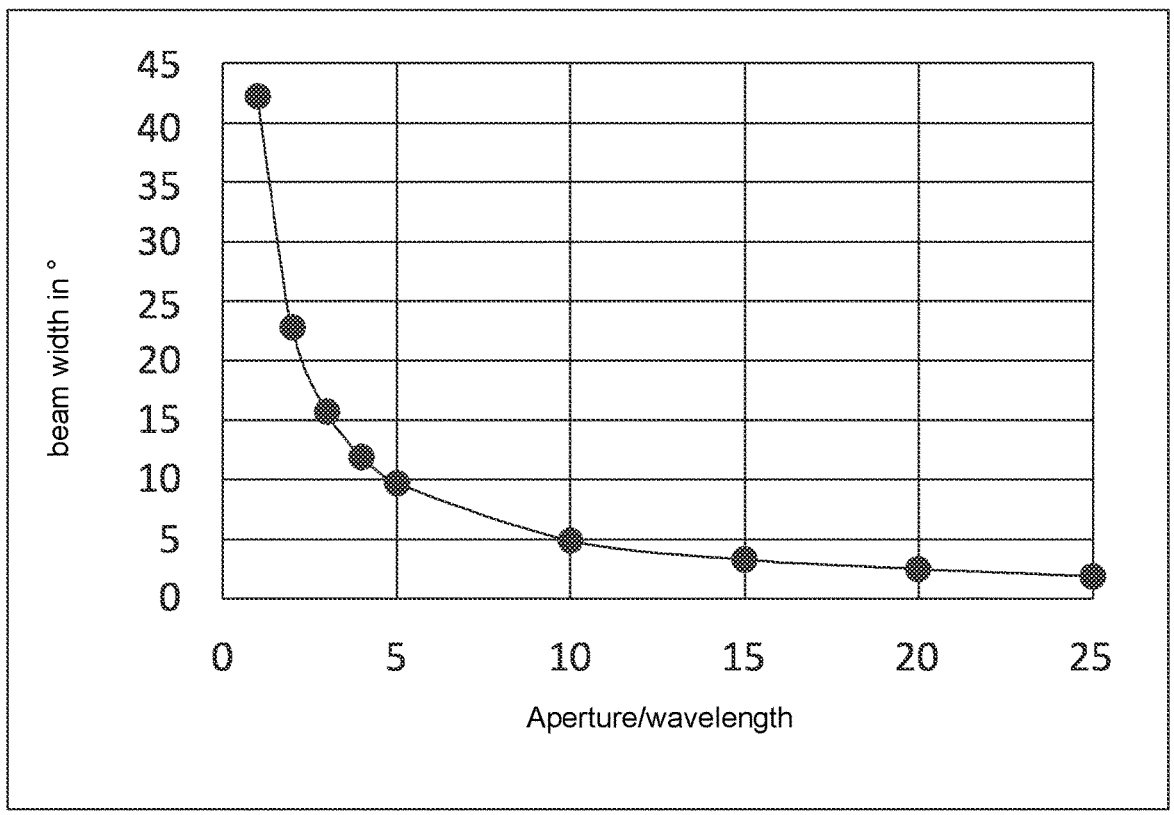
FIG. 5 shows a relationship of the achievable lateral resolution depending on the size of the receiver array.

FIG. 5 shows a relationship of the achievable lateral resolution (beam width, plotted on the y-axis) depending on the size of the receiver array (plotted as aperture/wavelength on the x-axis). An aperture of the array of about five times the wavelength shows in some examples a good combination of sufficient resolution and practicable array size for the use of survey vessels.

Later processing of the recorded data may improve the resolution beyond the beam width. Therefore, in some embodiments, the aim is to keep the aperture of the array greater than, or equal to, five times the wavelength, thus being able to achieve beam widths<10° (see FIG. 5). Smaller arrays are also possible, but the resolution may suffer from this reduction. To increase the resolution of the array in the profile direction, several consecutive shots of the source may be processed together into one. This allows the aperture of the array to be artificially enlarged in the profile direction ('synthetic aperture array'), and thus increasing the resolution of the data in this direction (e.g., see also FIG. 4d). In the example explained above, the receiver array may thus be at least 7.5 m wide (5×1.5 m wavelength of the source signal). The longitudinal extension of the array may be reduced, but it makes sense to include as many recording units as possible to improve the statistics of the recording. With regard to good manageability in practical use, a longitudinal aperture of 2.5 to 3 m may be considered to be reasonable. Typically, the vessel speed during such surveys corresponds to 3-5 knots, which is approximately 1.5-2.6 m/s. In order to match the artificial aperture in the longitudinal direction to the aperture in the transverse direction, all shots in a time window of about 3-5 s may be summarized into one synthetic array.

As shown, the arrangement of the receivers, i.e., the distance of the receivers from each other, in the array is an important influencing factor for an improved pick-up of scattered energy and the success of the detection of scattered energy in the images. In many cases, this is an important factor, as scatterings are very weak compared to reflections and therefore may easily be lost in the noise. The exact arrangement of the receivers in the array (e.g., right-angled uniformly, spirally or randomly distributed) also influences to a small extent the achievable resolution of the measurement. In at least some embodiments, the best resolution may be achieved with a regular lattice of receivers (cf. FIGS. 2 and 3), while the best signal amplification may be achieved with arrangements in which the distance between the receivers and the center of the array is not repeated. The latter arrangements may be achieved, for example, by spiral or randomly distributed and improved receiver arrangements.

Figure 6C:
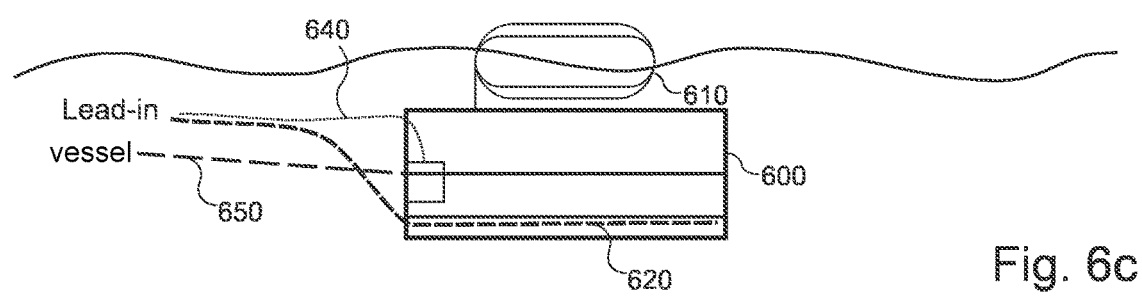

In this regard, embodiments comprise an attachment structure used to attach the receivers and signal source to the vessel so that they may be towed by the vessel. Particular attention may be paid here to how the receivers of the plurality of receivers (such as the receiver array) are attached. In the concrete execution, many possibilities are conceivable:

Rigid frame: Some embodiments are based on a fixed, buoyant frame, such as that shown in FIGS. 6a to 6c. As a source frequency of ~1000 Hz was used, example measurements described above could be used. The frame 610 shown (e.g., the second substructure of the attachment unit) is 8 m wide and 2.5 m long, and has a height of approximately 1 m. A motion reference unit 630 (MRU, a motion sensor) was also installed in the frame to monitor the movements of the frame and, if necessary, to correct the time offsets caused by these movements. The receiver units (such as the plurality of receivers) were attached to the frame and accurately calibrated. The frame also allows accurate depth control of the receivers. Accurate positioning of the frame may be achieved using a GPS, as with other executions (see below). Furthermore, the position of the individual receivers may be reconstructed by means of triangulation using a high-frequency acoustic signal recorded by the receivers. A receiver chain 620 (a so-called streamer) is attached on the frame 610 in loops (which may comprise the plurality of receivers) to span the receiver network in the required aperture, and an MRU cable 640 connecting the MRU 630 to the vessel. Reference number 610 denotes buoys configured to maintain the frame at a predefined water depth.

Rigid traction unit: As an alternative to the construction described above, only one fixed traction unit could be used. In this context, the receiver chains in the selected configuration may be attached to a rigid cross-connection at specific distances. This cross-connection may then be towed by the vessel. The receiver chains may hang freely in the water behind the towing device, the important transverse distances may be ensured by a rigid towing connection. The towing unit may then be as wide as the desired transverse extension of the array.

Otter boards: To avoid rigid units, the transverse extension may also be achieved by otter boards. In some embodiments, this implementation has the disadvantage of being more difficult to position. By towing the individual receiver chains with sufficiently small transverse distances, a usable receiver network may be created.

Broad vessel: If the vessel's width allows it or if it may be increased by jibs or cranes, the receiver chains may also be deployed directly from the vessel (via the attachment structure).

In some embodiments, the danger of the individual receiver chains crossing over each other due to the small transverse distances may be seen as a disadvantage here. Furthermore, simultaneous towing of an acoustic/seismic source is more difficult.

Synthetic transverse and longitudinal extension: A very narrow profile density of 2D or 3D seismic data with one or a few receiver chains in the survey area may allow the longitudinal and transverse extension of the array to be computed synthetically from multiple crossings. This type of data collection may be costly and prone to errors in data acquisition.

Using the method described the scattered wave field is also recorded transversely to the profile direction without spatial aliasing. This accurate recording of the scattered energy in space is not possible with some other acquisition geometries. For example, one of the things that sets the described system apart from other systems is its independently towed and adaptable signal source. In many embodiments, the described recording geometry allows for the reconstruction of scattering objects in the subsurface within a certain sediment volume along the measured profile. The size of the imaged data volume may depend on water depth, array size and the signal source used, among other things.

Scattering objects of various sizes may be located at different depths as the acquisition geometry may be adapted to the expected sizes and storage depths with the array size and the signal source. Other systems may be limited by vertical and horizontal resolution (e.g., reflection seismics) or results may be ambiguous (e.g., UXO detection by magnetics). Here, the methodology described offers a clear advantage with a specialized approach to object detection using scattered acoustic energy.

By accurately recording the wave field with a large-aperture array transversely to the profile direction, scattering objects may be detected and located up to a certain distance away from the profile. This localization of objects in the sediment transversely to the profile direction may not be possible with other methods, as it may be necessary for the latter to pass directly over the object for accurate localization. Thus, a defined measurement area may be measured more efficiently with the method described. Furthermore, inaccuracies in the object localization due to too large profile distances may be avoided during the 2D data acquisition.

With the system described, not only the scattered energy but also the reflected wave field may be picked up with high precision, thus allowing a high-resolution data set to be imaged in a strip directly below the towed receiver network. The highly accurate positioning of the individual receivers enables very precise imaging of the subsurface here. This secondary data set may be recorded and used in parallel with the scattered energy.

Marine seismic 3D surveys are well established in the offshore survey industry, particularly in the context of oil and gas exploration. The solution presented here represents an improvement of a 3D acquisition system. The special feature is at least the small transverse distance between the receivers, which may be used to pick up scattered energy without aliasing. Scattering energy is present in almost every seismic data set, but is generally ignored or even actively filtered out. Scattering energy may thus also be picked up with other non-optimized acquisition systems, but the evaluation will not be possible as with the method described here.

At least some embodiments deal with the detection, localization and characterization of objects in the subsurface. The method may be adapted to different object sizes and storage depths. Objects that may be located include glacial erratics, blocks, concretions and inhomogeneities that may be contained in sediments. Glacial erratics in particular pose a risk to the construction of marine infrastructure, e.g., wind turbines, platforms or pipelines. The installation of the foundations, e.g., by driving a monopile several tens of meters into the seabed, may be prevented or delayed by hitting a glacial erratic and the material may be damaged. Mapping of glacial erratics directly on the seabed is done as standard with other systems (e.g., multibeam or side-scan sonars), but mapping of glacial erratics in sediment cannot be performed reliably and efficiently with some other systems.

Another type of objects to be located is unexploded ordnance (UXO) in the sediment. These objects pose a major threat to marine construction projects, especially in the North and Baltic Seas. Often, UXOs are identified using magnetic methods and then require extensive identification and removal. UXOs may be buried up to several meters in the sediment and are sometimes impossible to locate with seabed mapping (multibeam/side-scan sonar). Furthermore, magnetic measurements often result in data artifacts that result in a false positive identification of UXOs. This entails extensive validation by divers/ROVs (Remotely Operated underwater Vehicle). At least some embodiments provide an efficient way to back up the magnetic measurements. Objects may be located in the subsurface and may be matched with the measured magnetic anomalies for improved identification of actually present UXOs. Furthermore, the system described may be used in (geo-)scientific or applied research on, e.g., cold and hot springs, fault surfaces, migration paths of fluids or glacial processes.

The aspects and features mentioned and described together with one or more of the previously detailed examples and figures may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the steps of the above-described methods. The program storage devices may comprise or be, for example, digital memories, magnetic storage media such as magnetic disks and magnetic tapes, hard drives, or optically readable digital data storage media. Further examples may also cover computers, processors or control units programmed to perform the steps of the above-described methods or (field) programmable logic arrays ((F)PLAs) or (field) programmable gate arrays ((F)PGAs), programmed to perform the steps of the above-described methods.

The description and drawings merely illustrate the principles of the disclosure. Furthermore, all examples recited herein are principally intended expressly to be only for illustrative purposes to aid the reader in understanding the principles of the disclosure and the concepts contributed by the inventor(s) to furthering the art. All statements herein reciting principles, aspects, and examples of the disclosure, as well as specific examples thereof, include equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a signal", "means for generating a signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, a network processor, an application specific integrated circuit (ASIC), a field programmable gate array (FPGA), a read only memory (ROM) for storing software, a random-access memory (RAM), and non-volatile storage. Other hardware, conventional and/or custom, may also be included.

A block diagram may, for instance, illustrate a rough circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective steps of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to also include features of a claim for any other independent claim even if this claim is not directly made dependent on the independent claim.

The invention claimed is:

1. A system for detecting one or more objects in a seabed, the system comprising:
    an attachment structure configured to mechanically couple a signal source and a plurality of receivers to a vessel or to a propulsion unit;
    the signal source being mechanically coupled to the attachment structure and configured to emit at least one acoustic signal towards the seabed, wherein a wavelength of the acoustic signal is adapted to an expected size of the one or more objects, so that the wavelength of the acoustic signal is at least 10% of the expected size and at most 1000% of the expected size of the one or more objects;
    the plurality of receivers being mechanically coupled to the attachment structure,
    wherein a distance between adjacent receivers is at most as large as half the wavelength of the acoustic signal,
    wherein the plurality of receivers is configured to generate a receiver signal based on a scattering of the at least one acoustic signal at the one or more objects; and
    a processing module configured to detect the one or more objects based on the receiver signal, wherein the detection of the one or more objects is based on the scattering of the at least one acoustic signal at the one or more objects,
    wherein the plurality of receivers are arranged in a regular or irregular grid, the grid having a first expansion direction and a second expansion direction, wherein the first expansion direction is defined along an intended direction of movement of the attachment structure, and wherein the second expansion direction is defined orthogonally to the intended direction of movement of the attachment structure,
    wherein an aperture of the grid in the second expansion direction is at least 25% greater than an aperture of the grid in the first expansion direction.

2. The system of claim 1, wherein the receivers of the plurality of receivers are arranged in a regular or irregular grid, wherein the processing module is configured to detect, based on the scattering of the acoustic signal at the one or more objects, the one or more objects both directly below the grid and laterally offset from the grid.

3. The system of claim 1, wherein the at least one signal source is at least one omnidirectional signal source.

4. The system of claim 1, wherein the at least one signal source is arranged in an extension of the first or second expansion direction relative to the plurality of receivers.

5. The system of claim 1, wherein the at least one signal source is arranged within the grid in which the receivers of the plurality of receivers are arranged.

6. The system of claim 1, wherein the signal source is configured to emit a plurality of acoustic signals in a predefined temporal sequence towards the seabed, the receiver signal being based on a scattering of the plurality of acoustic signals at the one or more objects, wherein the processing module is configured to detect the one or more objects based on the scattering of the plurality of acoustic signals at the one or more objects.

7. The system of claim 1, wherein an extension of the grid in the second expansion direction is at least twice a wavelength of the acoustic signal.

8. The system of claim 1, wherein the plurality of receivers is arranged in a multidimensional lattice structure.

9. The system of claim 8, wherein the multidimensional lattice structure is arranged on a rigid frame of the attachment structure.

10. The system of claim 8,
    wherein the plurality of receivers is arranged in a first expansion direction of the multidimensional lattice structure in a plurality of logical columns, and wherein the plurality of receivers is arranged in a second expansion direction of the multidimensional lattice structure in a plurality of logical lines,
    wherein the multidimensional lattice structure is attached to a rigid traction unit of the attachment structure, the plurality of logical columns being configured as a plurality of chains of receivers.

11. The system of claim 10, wherein the receivers of one logical line of the plurality of logical lines are coupled together by one or more rigid cross-connections.

12. The system of claim 10, wherein the attachment structure comprises at least one otter board, wherein the receivers of a logical row of the plurality of logical rows are coupled together by one or more flexible cross-connections, and wherein the at least one otter board is designed in interaction with the flexible cross-connections to span the plurality of chains of receivers in a predefined spatial expansion.

13. The system of claim 1, wherein the at least one signal source is configured to emit the acoustic signal such that a sound pressure reduction of 3 dB at 45° is not exceeded.

14. The system of claim 1,
    wherein the receiver signal comprises a first signal portion based on the scattering of the at least one acoustic signal at the one or more objects, and
    wherein the receiver signal comprises a second signal portion based on a reflection of the at least one acoustic signal,
    wherein the processing module is configured to separate the first signal portion from the second signal portion and to detect the one or more objects based on the first signal portion.

15. The system of claim 14, wherein the receivers of the plurality of receivers are arranged in a regular or irregular grid, wherein the processing module is configured to determine a piece of information about a distance of the one or more objects based on the second signal portion for those objects located below the grid.

16. The system of claim 1, comprising at least one further signal source configured to emit at least one further acoustic signal towards the seabed, wherein a wavelength of the further acoustic signal is at least 10% smaller or larger than the wavelength of the acoustic signal, and wherein the further signal source is configured to emit the further acoustic signal at a time offset to the acoustic signal.

17. A processing module for detecting one or more objects in the seabed, wherein the processing module is configured to:
- obtain a piece of information about at least one acoustic signal of an acoustic signal source, wherein a wavelength of the acoustic signal is adapted to an expected size of the one or more objects, so that the wavelength of the acoustic signal is at least 10% of the expected size and at most 1000% of the expected size of the one or more objects;
- obtain a receiver signal from a plurality of receivers, the receiver signal being based on a scattering of the at least one acoustic signal at the one or more objects;
- detect the one or more objects based on the receiver signal, wherein the detection of the one or more objects is based on the scattering of the at least one acoustic signal at the one or more objects,
- wherein the plurality of receivers are arranged in a regular or irregular grid, the grid having a first expansion direction and a second expansion direction, wherein the first expansion direction is defined along an intended direction of movement of an attachment structure for the receivers, and wherein the second expansion direction is defined orthogonally to the intended direction of movement of the attachment structure,
- wherein an aperture of the grid in the second expansion direction is at least 25% greater than an aperture of the grid in the first expansion direction.

18. A method for detecting one or more objects in the seabed, the method comprising:
- emitting an acoustic signal by an acoustic signal source, wherein a wavelength of the acoustic signal is adapted to an expected size of the one or more objects, so that the wavelength of the acoustic signal is at least 10% of the expected size and at most 1000% of the expected size of the one or more objects;
- generating a receiver signal by a plurality of receivers, wherein a distance between adjacent receivers is at most as large as half the wavelength of the acoustic signal, wherein the receiver signal is based on a scattering of the at least one acoustic signal at the one or more objects;
- detecting the one or more objects based on the receiver signal, wherein the detection of the one or more objects is based on the scattering of the at least one acoustic signal at the one or more objects,
- wherein the plurality of receivers are arranged in a regular or irregular grid, the grid having a first expansion direction and a second expansion direction, wherein the first expansion direction is defined along an intended direction of movement of an attachment structure for the receivers, and wherein the second expansion direction is defined orthogonally to the intended direction of movement of the attachment structure,
- wherein an aperture of the grid in the second expansion direction is at least 25% greater than an aperture of the grid in the first expansion direction.

* * * * *